UNITED STATES PATENT OFFICE.

JOHN L. JENKINS AND AUGUSTOS W. RICHARDS, OF SILVER RUN, ALA.

IMPROVEMENT IN VARNISHES.

Specification forming part of Letters Patent No. 171,384, dated December 21, 1875; application filed November 5, 1875.

*To all whom it may concern:*

Be it known that we, JOHN L. JENKINS and AUGUSTOS W. RICHARDS, of Silver Run, in the county of Talladega and in the State of Alabama, have invented certain new and useful Improvements in Varnish; and do hereby declare that the following is a full, clear, and exact description thereof, reference being had to the accompanying drawings, and to the letters of reference marked thereon, making a part of this specification.

Our invention consists in a compound for varnish, as will be hereinafter more fully set forth. It is composed of the following ingredients, viz: One ounce copal varnish, one ounce coach-varnish, one ounce japan varnish, one ounce dammar varnish, one ounce boiled oil, two ounces turpentine, one dram gum-shellac, one ounce alcohol, one-half dram litharge. These ingredients are thoroughly mixed after the gum-shellac has been first dissolved in the alcohol. When these ingredients are thus mixed, add one-half dram nitric acid and one-half dram antimonial wine, when the varnish is ready for use. It should, however, be well shaken or stirred before using.

After one coat of this varnish has been put on, a suitable quantity of asphaltum is added to it to give a color to the second coat, and so on for each coat more asphaltum may be added, until at last the varnish has a jet-black color, with a fine glossy finish.

Any shade of color may be obtained by adding more or less asphaltum to the original composition.

This varnish will neither scald, blister, nor crack from exposure to any weather.

I do not confine myself to the particular proportions of the ingredients herein mentioned, as they may perhaps be varied according to the quality of work desired.

Having thus fully described my invention, what I claim as new, and desire to secure by Letters Patent, is—

A varnish composed of copal varnish, coach varnish, japan varnish, dammar varnish, boiled oil, turpentine, gum-shellac, alcohol, litharge, nitric acid, and antimonial wine, substantially as set forth.

In testimony that we claim the foregoing we have hereunto set our hands this 15th day of October, 1875.

J. L. JENKINS.
A. W. RICHARDS.

Witnesses:
JOHN S. LINDSAY,
C. L. EVERT.